(12) United States Patent
Bezbaruah et al.

(10) Patent No.: US 7,386,694 B1
(45) Date of Patent: Jun. 10, 2008

(54) SYSTEM AND METHOD FOR READING MIRRORED DATA

(75) Inventors: Angshuman Bezbaruah, Pune (IN); Vivek V. Gupta, Pune (IN); Ashwani Mujoo, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 237 days.

(21) Appl. No.: 10/321,930

(22) Filed: Dec. 17, 2002

(51) Int. Cl.
*G06F 12/06* (2006.01)

(52) U.S. Cl. .................................. 711/162; 711/114

(58) Field of Classification Search ............... 711/114, 711/6, 203, 112, 162, 165, 133, 136, 135; 350/230.3; 714/6

See application file for complete search history.

(56) References Cited

U.S. PATENT DOCUMENTS

| | | | | |
|---|---|---|---|---|
| 5,511,177 A | * | 4/1996 | Kagimasa et al. ........... 711/114 |
| 5,787,485 A | * | 7/1998 | Fitzgerald et al. .......... 711/162 |
| 5,812,748 A | * | 9/1998 | Ohran et al. ................... 714/4 |
| 6,076,143 A | * | 6/2000 | Blumenau .................... 711/114 |
| 6,092,213 A | * | 7/2000 | Lennie et al. .................. 714/3 |
| 6,397,292 B1 | * | 5/2002 | Venkatesh et al. .......... 711/114 |
| 6,542,962 B2 | * | 4/2003 | Kodama et al. ............. 711/114 |
| 2003/0002378 A1 | * | 1/2003 | Uchida et al. ......... 365/230.03 |
| 2004/0003196 A1 | * | 1/2004 | Wilson et al. .............. 711/171 |

* cited by examiner

*Primary Examiner*—Pierre-Michel Bataille
(74) *Attorney, Agent, or Firm*—Campbell Stephenson LLP

(57) ABSTRACT

Disclosed is a method and apparatus for reading mirrored data. In one embodiment, a node receives a read request for data, identical copies of which are maintained on a primary storage device and any number of corresponding mirrors. A read generator coupled to the node generates a number of read operations for smaller portions of the data. Preferably, the read generator then transmits the read operations in parallel to at least two storage devices on which identical copies of the data are maintained (e.g., a primary storage device and a corresponding mirror, two mirrors of a primary storage device, etc.). The read operations may then be processed in parallel by the storage devices to which the read operations were transmitted.

26 Claims, 5 Drawing Sheets

SYSTEM AND METHOD FOR READING MIRRORED DATA

BACKGROUND OF THE INVENTION

Mirroring involves the process of maintaining identical copies of data on separate storage devices. FIG. 1 illustrates an exemplary data processing system 100 that employs mirroring. Data processing system 100 includes a node 102 coupled to clients 104-110 via a network 112. Node 102 is also coupled to a primary data storage device 114 and a mirror 116 via a network 118. A mirror is a data storage device on which an identical copy of data from a primary storage device is maintained (as such, primary storage device 114 may also be referred to as mirrored storage device 114).

Primary storage device 114 and mirror 116 store identical copies of data. In other words, at least a portion, if not all, of the data stored on primary storage device 114 is identical to at least a portion, if not all, of the data stored on mirror 116. Primary storage device 114 and mirror 116 are separate data storage devices. Each of primary storage device 114 and mirror 116 may include one or more magnetic or optical disk arrays and/or one or more redundant arrays of independent disks (RAID) and RAID controllers.

Node 102 may be a computer, such as server, that provides services to and/or manages resources of devices coupled to networks 112 and 118. Node 102 includes one or more processors 120 configured to execute instructions that reside on computer readable media (not shown). Node 102 also includes a data storage manager 122. Data storage manager 122 may be in the form of instructions residing on computer readable media which direct processor 120 to perform specific steps.

One example of data storage manager 122 is a volume manager. A volume manager operates to provide storage virtualization. For example, with storage virtualization, data storage manager 122 may present primary storage device 114 and mirror 116 to clients 104-110 as a virtual disk 124. From the viewpoint of clients 104-110, virtual disk 124 is equivalent to one physical data storage device (a virtual disk may also be referred to as a volume). In providing storage virtualization, data storage manager 122, rather than clients 104-110, handles the distribution of data across primary storage device 114 and mirror 116. Although data storage manager 122 may take the form of a volume manager, the functions of data storage manager 122 may be spilt between a volume manager and a file system (not shown) residing on node 102. The functions of data storage manager 122 may also be integrated into a file system residing on node 102.

Data storage manager 122 also enables mirroring within data processing system 100. For example, to create mirror 116, data storage manager 122 selects all or a portion of data on primary storage device 114 and copies the selected data to mirror 116, making sure to account for read and write requests from clients 104-110 during the copy process (e.g., by queuing the requests, processing the requests concurrently with the copy process, etc.).

In order to keep the copy of data stored on mirror 116 identical to the respective data of primary storage device 114, data storage manager 122 issues simultaneous write operations to primary storage device 114 and mirror 116 for each write request received from a client 104-110. For example, when data storage manager 122 receives a write request from a client 104-110 to write data to virtual disk 124, data storage manager 122 generates two write operations: one write operation to write the data to primary storage device 114, and a second write operation to write the data to mirror 116. Primary storage device 114 and mirror 116 receive their respective write operation and respond by writing the requested data. By issuing simultaneous writes in this manner, the data on mirror 116 is kept identical to respective data on primary storage device 114.

Data of mirror 116 may be synchronized with (i.e., maintained as identical) data of primary storage device 114 either synchronously or asynchronously. In synchronous operation, any data modification to primary storage device 114 will immediately be propagated to mirror 116. In asynchronous operation, all data modifications to primary storage device 114 are logged and periodically transmitted to mirror 116 for updating the data on mirror 116 at a later time. The data modifications may be logged in a log file stored on node 102 or, alternatively, may be handled by a logging device integrated with, or coupled to, node 102. Asynchronous operation is typically implemented when primary storage device 114 and mirror 116 are a considerable distance apart from each other. The data of primary storage device 114 and mirror 116 may be substantially identical at times, recognizing that there may be a delay between the time data is written to primary storage device 114 and when mirror 116 is updated with the data.

Mirroring proves useful for employing redundant data storage devices within data processing system 100. With the use of redundant data storage devices, organizations such as financial institutions, data storage providers, insurance companies, etc., can minimize the downtime associated with a failure of one of the data storage devices on which their business data is stored. For example, should primary storage device 114 fail, a replacement primary data storage device may be hot-swapped in the failed device's place and data from mirror 116 may be copied over to the new primary data storage device. All the while, node 102 may satisfy read and write requests from clients 104-110 via data on mirror 116.

In addition to providing redundancy, mirroring also allows for the load balancing of data across multiple data storage devices, off-line analysis of production data, enabling off-line back-ups, and disaster recovery. Yet in spite of its many uses, traditional implementations of mirroring provide little, if any, benefit in the way of I/O performance.

SUMMARY OF THE INVENTION

Disclosed is a method and apparatus for reading mirrored data. In one embodiment, a node receives a read request for data, identical copies of which are maintained on a primary storage device and any number of corresponding mirrors. A read generator coupled to the node generates a number of read operations for smaller portions of the data. Preferably, the read generator then transmits the read operations in parallel to at least two storage devices on which identical copies of the data are maintained (e.g., a primary storage device and a corresponding mirror, two mirrors of a primary storage device, etc.). The read operations may then be processed in parallel by the storage devices to which the read operations were transmitted.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention relates to reading data from a primary data storage device and/or a number of mirrors of the primary data storage device. A mirror refers to a data storage device on which an identical copy of data of a primary storage device is maintained (the primary storage device may also be referred to as a mirrored storage device). In one embodiment of the present invention, a read generator receives a read request for data, identical copies of which are stored on a primary storage device and any number of mirrors. The read generator generates a number of read operations for preferably smaller portions of the data. Preferably, the read generator then transmits the read operations in parallel to at least two storage devices on which identical copies of the data are maintained (e.g., the primary storage device and a mirror, two mirrors, five mirrors, etc.). By apportioning a read request in this manner, the present invention is able to exploit the parallel capabilities of a mirrored data configuration and the I/O performance of reading data from a mirrored storage device is preferably improved. Additionally, should data on the mirrored storage device become inaccessible, the data remains available on the mirror (or mirrors). Moreover, the present invention may be utilized without the need to perform any data formatting technique other than mirroring (e.g., there is no need to stripe the data). In fact, the present invention enables the I/O performance of reading mirrored data (not striped) to equal, if not better, the I/O performance of reading striped data (assuming the number of stripe columns is not greater than the number of storage devices containing identical copies of the data). The following text and Figures are intended to provide a detailed description of exemplary embodiments of the invention. However, the scope of the invention should not be limited to the examples provided herein, but rather should be defined by the claims provided at the end of the description.

Figure 1:
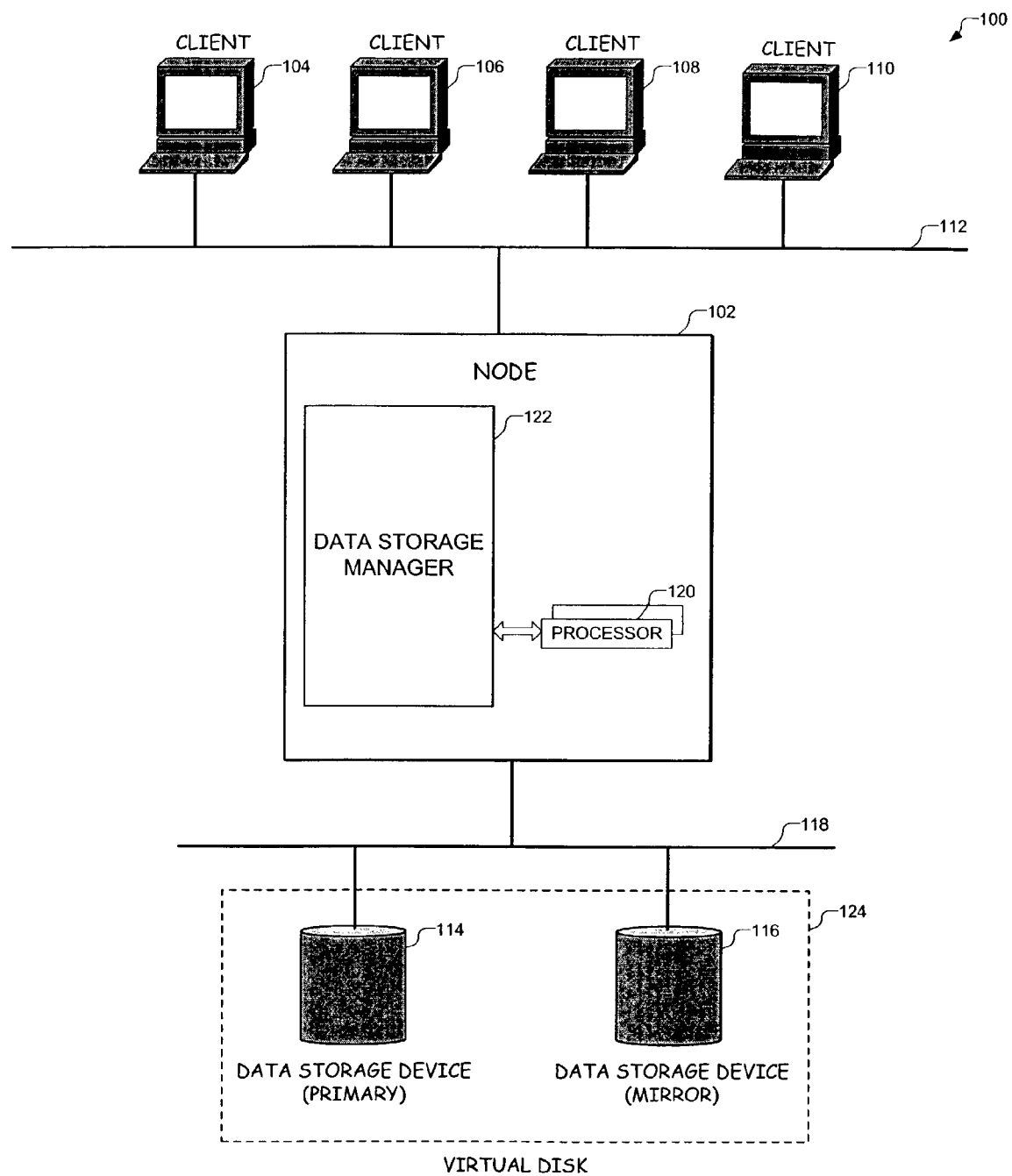
FIG. 1 is a block diagram of a data processing system employing mirroring.
Figure 2:
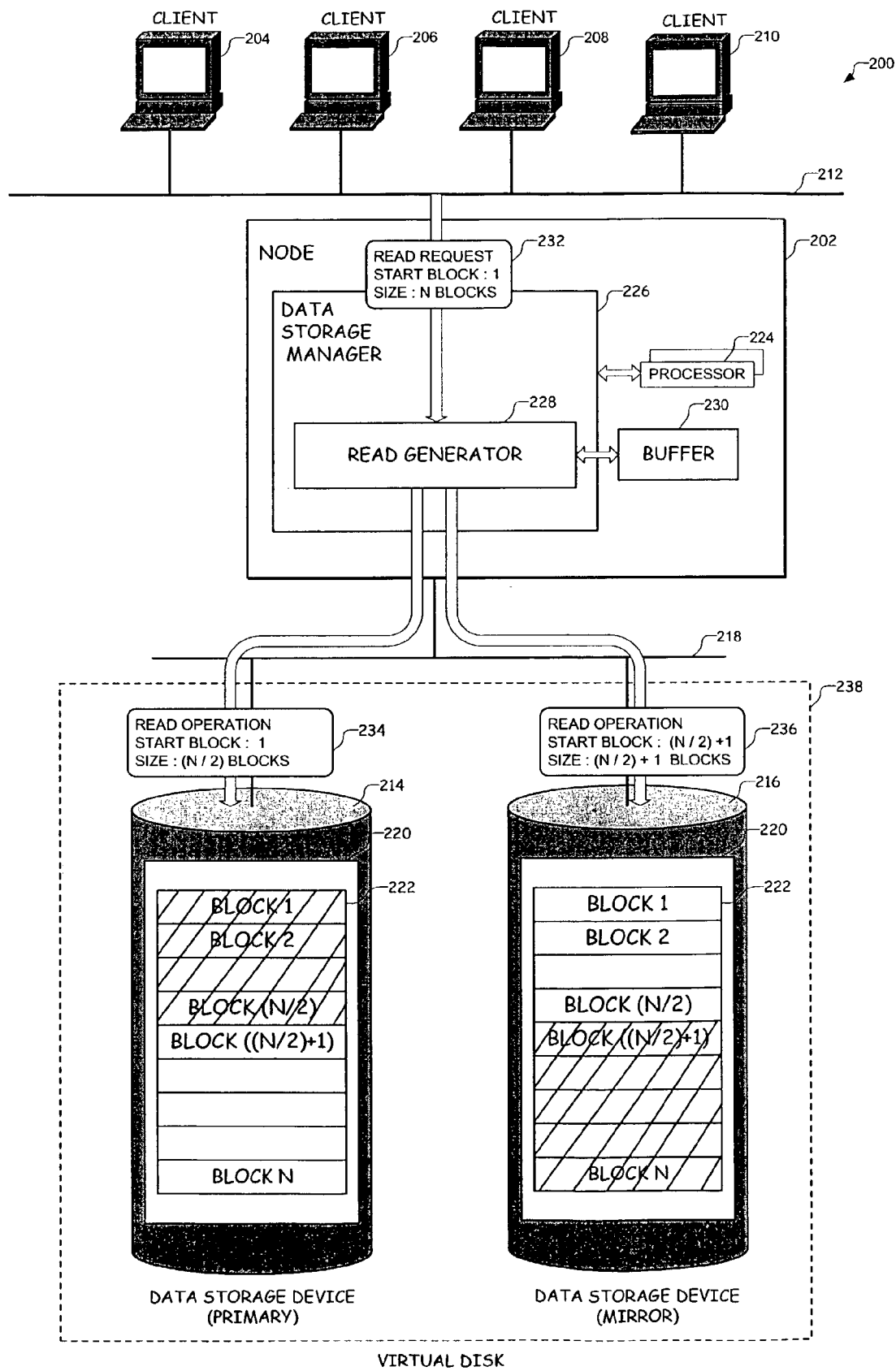
FIG. 2 is a block diagram of a data processing system employing one embodiment of the present invention.

FIG. 2 illustrates an exemplary data processing system 200 that utilizes the present invention to apportion read requests for mirrored data in accordance with the present invention. Data processing system 200 includes a node 202 coupled to clients 204-210 via a network 212. Node 202 is also coupled to a primary data storage device 214 and a mirror 216 via a network 218. Coupling, as used herein, is used to describe direct or indirect coupling (i.e., two devices may be coupled to each other via another device). A mirror refers to a data storage device on which an identical copy of data from a primary storage device is maintained (as such, primary storage device 214 may also be referred to as mirrored storage device 214).

Primary storage device 214 and mirror 216 store identical copies of data 220. Although FIG. 2 illustrates one mirror of primary storage device 214, it is recognized that the present invention can be extended to any number of mirrors of primary storage device 214. Primary storage device 214 and mirror 216 are separate data storage devices. Primary storage device 214 and mirror 216 may each include one or more magnetic or optical disk arrays and/or one or more redundant arrays of independent disks (RAID) and RAID controllers.

Data 220 may be stored on primary storage device 214 and mirror 216 in blocks 222, as illustrated in FIG. 2. A block is a logical concept that represents the basic unit of addressing data in a data storage device. The size of a block may vary depending on the formatting method used for the data storage device. Data 220 includes blocks 1 through N, illustrating that the present invention may be utilized with any size data. Blocks 222 may be contiguously or discontiguously distributed within each of primary storage device 214 and mirror 216.

Node 202 may be a computer (e.g., a server, intelligent disk array, switch, data storage device controller, etc.) that provides services to and/or manages resources of devices coupled to networks 212 and 218. Node 202 includes one or more processors 224 configured to execute instructions that reside on computer readable media (not shown). The computer readable media may take the form of RAM, ROM, flash RAM, CD-ROM, DVD, diskette, or other similar computer readable media. Node 202 also includes a data storage manager 226, a read generator 228, and a buffer 230. Data storage manager 226 and read generator 228 may be in the form of instructions residing on computer readable media which direct node 202 to perform specific steps.

Data storage manager 226 enables storage virtualization. With storage virtualization, data storage manager 226 may represent a number of storage devices to clients 204-210 as one (or more) virtual disks. For example, data storage manager 226 may represent primary storage device 214 and mirror 216 to clients 204-210 as a virtual disk 238. From the viewpoint of clients 204-210, virtual disk 238 is equivalent to one physical data storage device (a virtual disk may also be referred to as a volume). In providing storage virtualization, data storage manager 226, rather than clients 204-210, handles the distribution of data across primary storage device 114 and mirror 116. Storage virtualization is not limited to mirrored data configurations, but may also be utilized in a number of other storage configurations such as multi-disk environments, striped data configurations, RAID configurations, etc.

Data storage manager 226 also enables mirroring within data processing system 200. Initially, to create mirror 216, data storage manager 226 selects data 220 on primary storage device 214 and copies data 220 to mirror 216, making sure to account for read and write requests from clients 204-210 during the copy process (e.g., by queuing the requests, processing the requests concurrently with the copy process, etc.).

In order to keep data 220 stored on mirror 216 identical to data 220 of primary storage device 214, data storage manager 226 issues simultaneous write operations to primary storage device 214 and mirror 216 for each write request received from a client 204-210. For example, when data storage manager 226 receives a write request from a client 204-210 to write to virtual disk 238, data storage manager 226 generates two write operations: one write operation to write to primary storage device 214, and a second write operation to write to mirror 216. Primary storage device 214 and mirror 216 receive their respective write operation and respond by writing the requested data. By issuing simultaneous writes in this manner, data 220 on mirror 216 is kept identical to data 220 on primary storage device 214.

Data storage manager 226 may maintain data of mirror 216 identical to data of primary storage device 214 either synchronously or asynchronously. In synchronous operation, any data modification to primary storage device 214 will immediately be propagated to mirror 216. In, asynchronous operation, all data modifications to primary storage device 214 are logged and periodically transmitted to mirror 216 for updating the data on mirror 216 at a later time. The data modifications may be logged in a log file stored on node 202 or may alternatively be handled by a logging device integrated with, or coupled to, node 202. Asynchronous operation is typically implemented when primary storage device 214 and mirror 216 are a considerable distance apart from each other. The data of primary storage device 214 and mirror 216 may be substantially identical, recognizing that there may be a delay between the time data is written to primary storage device 214 and when mirror 216 is updated with the data. It is recognized that the data of primary storage device 214 and mirror 216 may be substantially not identical for reasons other than delays in updating data. For example, the metadata of data 220 on primary storage device 214 may differ from the metadata of data 220 on mirror 216 (metadata may include such information as physical disk description, security information, filename, block address, etc.).

Data storage manager 226 also functions to assign and manage a read policy associated with primary storage device 214 and mirror 216. In one embodiment, a system administrator of node 202 associates a read policy with primary storage device 214 and mirror 216 by assigning the read policy to virtual disk 238 via data storage manager 226. The read policy is generally the method by which read generator 228 distributes read operations to primary storage device 214 and mirror 216. Common read policies include round robin, preferred mirror and least busy.

With the round robin method, read requests are processed by primary storage device 214 and mirror 216 in round robin fashion. For example, primary storage device 214 may process a first read request from clients 204-210, mirror 216 may process a second read request from clients 204-210, etc. With the preferred mirror method, one of primary storage device 214 and mirror 216 is selected to process a read request. Using the least busy read policy, the read request is directed to whichever of primary storage device 214 or mirror 216 has the least number of read requests to process.

Data storage manager 226 may interface with a file system (not shown) and/or a database management system (not shown) that may in turn interface with applications (not shown) on node 202 and/or clients 204-210. Additionally, data storage manager 226 may interface with services of an operating system (not shown) of node 202, which in turn may interface with host adapters (not shown) of node 202 and with primary storage device 214 and mirror 216. The functions of data storage manager 226 may also be integrated into the file system and/or the operating system. In one embodiment of the present invention, data storage manager 226 is Volume Manager™, a product of VERITAS Software Corporation of Mountain View, Calif.

The present invention adds a new read policy to the aforementioned list of read policies. Employing a read policy according to the present invention, a read request to virtual disk 238 is apportioned to primary storage device 214 and mirror 216, as described below.

Read generator 228, which may or may not be a component of data storage manager 226, functions to receive a read request from clients 204-210 for data stored on virtual disk 238 (i.e., data stored on primary storage device 214 and mirror 216). For the read request, read generator 228 generates a number of read operations for preferably smaller portions of the data. In the presently described embodiment of FIG. 2, the size of each portion of each read operation is equal to the size of data of the read request divided by the number of data storage devices on which identical copies of the data is maintained (i.e., a primary storage device plus any associated mirrors of the primary storage device). Any amount of data remaining from the division may be added to any of the read operations. Once the sizes of the portions of the read operations have been determined, the read operations are transmitted in parallel to preferably at least two of the storage devices on which identical copies of the data is maintained (e.g., a primary storage device and a mirror, two mirrors, etc.).

For example, as illustrated in FIG. 2, read generator 228 receives a read request 232 from one of clients 204-210. Read request 232 is for N blocks of data 220 stored on primary storage device 214 beginning at block 1 (N is odd in the presently described embodiment). An identical copy of data 220 is also maintained on mirror 216. Upon receiving read request 232, read generator 228 checks the read policy associated with primary storage device 214 and mirror 216 (e.g., the read policy assigned to virtual disk 238). If the read policy allows for apportioning a read request according to the present invention, two read operations are generated, 234 and 236, each for a portion of data 220.

The portion of data 220 for a first read operation 234 begins at block 1 and has a size equal to (N/2) blocks, or the size of the data of the read request (N) divided by the number of data storage devices on which identical copies of the data exist (M) (e.g., 2 in the present example, primary storage device 214 plus mirror 216). The divisions described herein (e.g., N/2) refer to integer divisions. The hashed area of data 220 within primary storage device 214 illustrates this first portion of data 220.

Similarly, the portion of data 220 for a second read operation 236 begins at block ((N/2)+1) and has a size equal to ((N/2)+1) blocks. The second portion of data resides on mirror 216. In the presently described example, remainder blocks are added to the second portion of second read operation 236, although remainder blocks may be added to either the first or second portion. The number of remainder blocks may be determined by the formula N modulo M, where N represents the size of the data of the read request and M represents the number of storage devices on which identical copies of the data exist. In the presently described example, one remainder block exists (because, e.g., M is 2 and N is odd). The remainder block is accounted for by increasing the size of the data portion of second read operation 236 by 1. The hashed area of data 220 within mirror 216 illustrates this second portion of data 220.

First and second read operations 234 and 236, respectively, are transmitted, preferably in parallel, to primary storage device 214 and mirror 216, respectively. Once received, primary storage device 214 and mirror 216 process the read operations, preferably in parallel, and return the respective portions of data 220. In one embodiment of the present invention, buffer 230 stores data retrieved from primary storage device 214 and mirror 216. Although in the presently described embodiment read operations are transmitted to primary storage device 214 and mirror 216, one of skill in the art will appreciate that read operations may be transmitted to any combination of storage devices on which identical copies of the data is maintained. Additionally, although data 220 of primary storage device 214 and mirror 216 has been illustrated as having similar block addresses on each storage device, the block address of data 220 may differ on each of the devices.

Figure 3:
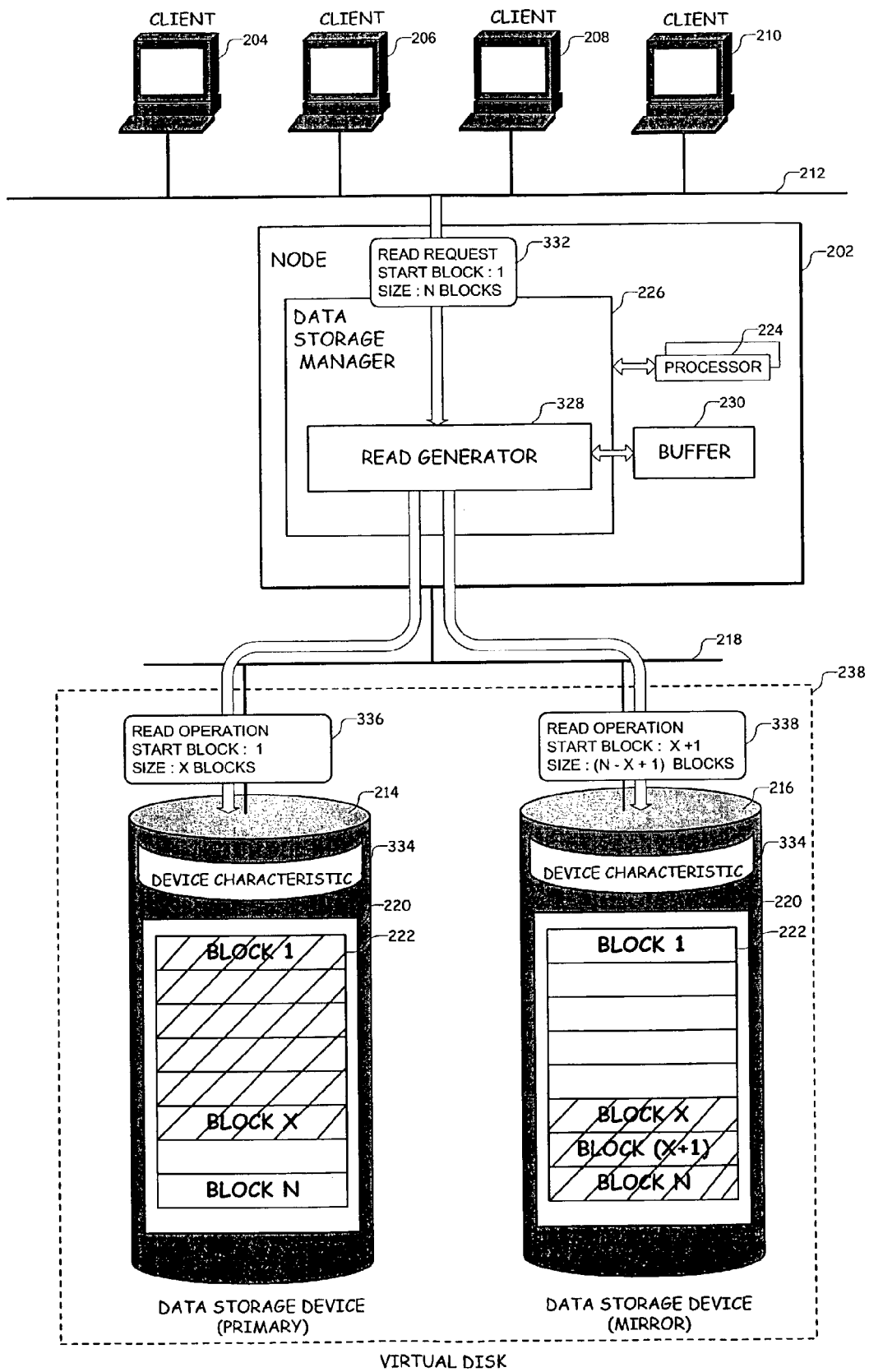
FIG. 3 is a block diagram of a data processing system employing a second embodiment of the present invention.

FIG. 3 illustrates another embodiment of the present invention for use in reading mirrored data. Whereas the embodiment illustrated in FIG. 2 operates to apportion a read request based upon the number of storage devices on which identical copies of the data is maintained, the embodiment of FIG. 3 operates to apportion a read request based on one or more characteristics of the data storage devices on which identical copies of the data is maintained, such as seek time, latency, data transfer time, head position, and/or cache size. Other characteristics may also be considered.

The seek time of a storage device (for example, a magnetic, optical, or other type disk drive) is an average time of how long a disk drive takes to move read/write heads to a particular location on the disk. Seek time includes controller overhead but does not include latency. Latency is the time it takes the disk drive to place the correct area of the disk under the read/write head. Data transfer time, on a read operation, generally refers to the amount of time it takes to fill a disk drive's buffer with the data and to the time it takes the data to travel over the connection (e.g., data transfer time accounts for the fact that one data storage device may be local and another data storage device may be a considerable distance away). Head position refers to the current location of the read/write heads.

Turning now to FIG. 3, read generator 328 receives a read request 332 from one of clients 204-210. Read request 332 is for N blocks of data 220 beginning at block 1. Upon receiving read request 332, read generator 328 checks the read policy associated with primary storage device 214 and mirror 216, respectively. If the read policy allows for apportioning a read request according to the present invention, read generator 328 evaluates a device characteristic 334 of primary storage device 214 and mirror 216. In the present embodiment, read generator 328 may query primary storage device 214 and mirror 216 to obtain each of the device characteristics 334, or alternatively, read generator 328 may obtain the device characteristics 334 from memory of node 202.

Read generator 328 may use device characteristics 334 to determine the number of read operations to generate, the size of the portions of data to read for each read operation, and/or which storage devices a read operation should be transmitted to. For example, in the presently described embodiment, based upon an evaluation each of the device characteristics 334 of primary storage device 214 and mirror 216, read generator 328 generates two read operations, 336 and 338, each for portions of data 220.

A first read operation 336 is a read operation for approximately the first two-thirds of data 220, as illustrated in the hashed area of data 220 contained in primary storage device 214. A second read operation 338 is a read operation for approximately the last one-third of data 220, as illustrated in the hashed area of data 220 contained in mirror 216. In the presently described embodiment, portions of the first and second read operations 336 and 338, respectively, overlap by at least one block. In other embodiments, the portions may be mutually exclusive.

The respective sizes of the first and second portions may be based on a determination by read generator 328 that primary storage device 214 is faster (e.g., two-thirds faster) than mirror 216 (e.g., because primary storage device 214 may be a local storage device while mirror 216 may be a remote mirror). This determination of the relative speeds of primary storage device 214 and mirror 216 may result from comparing seek time, latency, and/or data transfer rate, for example. Alternatively, the respective sizes of the first and second portions may be the result of read generator 328 determining that the head positions of primary storage device 214 and mirror 216 are such that the first two-thirds of data 220 should be processed by primary storage device 214 and the last one-third of data 220 should be processed by mirror 216. In other words, the head location of primary storage device 214 may be at or near block 1 while the head location of mirror 216 may be at or near block X.

Figure 4:
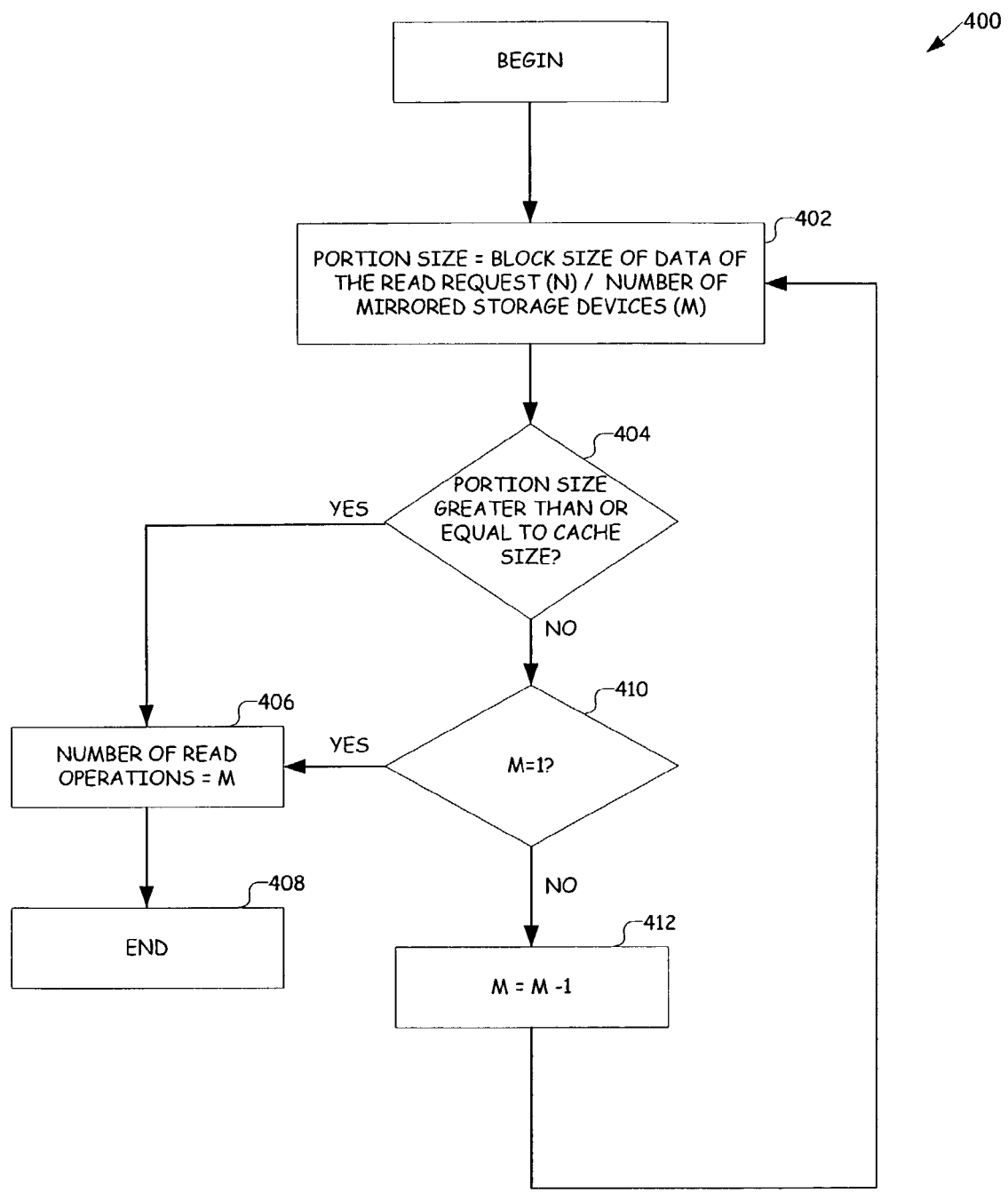
FIG. 4 is a flow chart of illustrating a method performed by one embodiment of the present invention.

In another embodiment of the present invention, it may be desirable to apportion the data of read request 332 such that the size of a portion of a read operation transmitted to a primary storage device and associated mirrors is equal to or greater than the cache size of the primary storage devices and mirrors, respectively. FIG. 4 is a flow chart illustrating such a technique.

Initially, the portion size for each read operation is determined by dividing the block size of the data of read request 332 by the number of storage devices on which identical copies of the data exits (M) (2 in the present example, primary storage device 214 plus mirror 216) (step 402). Next, the portion size is compared with the cache size of primary storage device 214 and mirror 216 (decision block 404). In the presently described embodiment, it is assumed that the portion sizes of the read operations are equal (or substantially equal taking into account any remainder blocks). It is also assumed that the cache size is the smallest cache size of primary storage device 214 and mirror 216.

If the portion size is greater than or equal to the cache size, ("Yes" branch of decision block 404), the number of read operations is set to the current value of M (step 406) and the operation is complete (step 408). If, however, the portion size is less than the cache size, (M) is repeatedly decremented, and the portion size is recalculated, until either the portion size is greater than or equal to the cache size, or until (M) is equal to one. If (M) is equal to one, then only one read operation need be generated to one primary storage device 214 ("Yes" branch of decision block 410). Once complete, (M) read operations may be transmitted, preferably in parallel, to (M) storage devices, where the value of (M) is determined by the process illustrated in flow chart 400.

It will be recognized that many alternative apportionments of a read request may be performed, and based on the description provided herein, those of skill in the art will appreciate suitable modifications to the exemplary embodiments.

Figure 5:
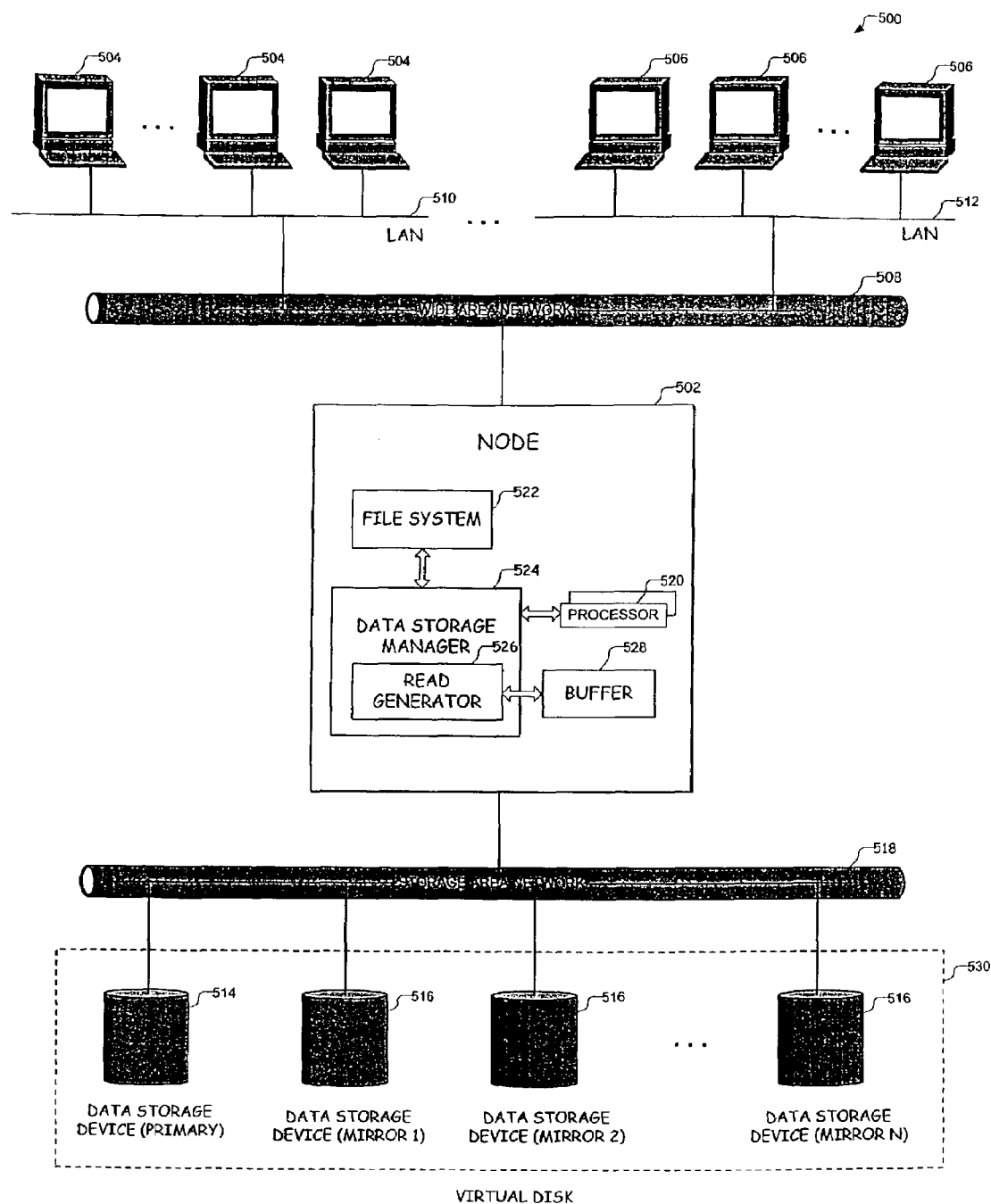
FIG. 5 is a block diagram of another data processing system employing an embodiment of the present invention.

FIG. 5 is a block diagram of another data processing system employing an embodiment of the present invention. A node 502 is coupled to clients 504 and 506 via a wide-area network 508 and local-area networks 510 and 512, respectively. Node 502 is also coupled to primary storage device 514 and mirrors 516 via a storage area network 518. Primary storage device 514 and mirrors 516 store identical copies of data.

Node 502 includes one or more processors 520 configured to execute instructions that reside on computer readable media (not shown). The computer readable media may take the form of RAM, ROM, flash RAM, CD-ROM, DVD, diskette, or other similar computer readable media. Node 502 also includes file system 522, a data storage manager 524, a read generator 526 in accordance with the present invention, and a buffer 528. Data storage manager 524 and read generator 526 may be in the form of instructions residing on computer readable media which direct node 502 to perform specific steps. Data storage manager 524 presents primary storage device 514 and mirrors 516 to clients 504 and 506 as a virtual disk 530. In accordance with the present invention, read generator 526 operates to apportion a read request from clients 504 and 506 for data on virtual disk 530 to any combination of primary storage device 514 and mirrors 516.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A system comprising:
   a node including a processor, the node configured to receive a read request for data; and
   a read generator coupled to the node, wherein
      the read generator is configured to apportion the read request to a first read operation for a first portion of the data stored on a first data storage device and a second read operation for a second portion of the data stored on a second data storage device,
      each of the first and second data storage devices include substantially identical copies of the data, and
      the first portion of the data and second portion of the data partially overlap one another by at least one block.

2. The system of claim 1 wherein the read generator is further configured to:
   generate a first read operation for a first portion of the data and a second read operation for a second portion of the data; and
   transmit the first read operation to the first data storage device and the second read operation to the second data storage device.

3. The system of claim 1 further comprising:
   the first and second data storage devices coupled to the node.

4. The system of claim 3 wherein the second data storage device is a mirror of the first data storage device.

5. The system of claim 1 further comprising:
   a determination unit configured to determine a first characteristic of the first data storage device and a second characteristic of the second data storage device, wherein
      the first and the second characteristics are a characteristic that is one of a seek time, a latency, a data transfer rate, a data storage device cache size, and a head position.

6. A system comprising:
   means for determining a first size for a first portion of data and a second size for a second portion of the data in response to receiving a read request for the data, wherein the data is stored on a first data storage device and a substantially identical copy of the data is stored on a second data storage device; and
   means for creating a first read operation for the first portion of the data and a second read operation for the second portion of the data, wherein the first portion of the data and second portion of the data partially overlap one another by at least one block.

7. The system of claim 6 further comprising:
   means for issuing the first read operation to the first storage device concurrently with issuing the second read operation to the second storage device.

8. The system of claim 6 further comprising:
   means for maintaining substantially identical copies of the data on the first and the second storage devices.

9. The system of claim 6 further comprising:
   means for creating a virtual disk including the first and second storage devices; and
   means for assigning a read policy to the virtual disk to allow an apportioning of the read request to the first and the second data storage devices.

10. The system of claim 6 further comprising:
    means for determining a first characteristic of the first data storage device and a second characteristic of the second data storage device, wherein
       the first and the second characteristics are a characteristic that is one of a seek time, a latency, a data transfer rate, a data storage device cache size, and a head position.

11. A method comprising:
    receiving a read request for data; and
    apportioning the read request to a first and a second data storage device, wherein
       the data is stored on the first data storage device,
       a substantially identical copy of the data is stored on the second data storage device,
       the apportioning comprises
          generating a first read operation for a first portion of the data,
          generating a second read operation for a second portion of the data,
          transmitting the first read operation to the first data storage device, and
          transmitting the second read operation to the second data storage device, and
       the first portion of the data and second portion of the data partially overlap one another by at least one block.

12. The method of claim 11 wherein the first and second read operations are transmitted concurrently.

13. The method of claim 11 further comprising:
    maintaining identical copies of the data on each of the first and second storage devices.

14. The method of claim 11 further comprising:
    determining a read policy associated with the first and the second data storage devices; and
    performing the apportioning when the read policy allows for apportioning the read request.

15. The method of claim 14 further comprising:
    creating a virtual disk including the first and second storage devices; and
    assigning a read policy to the virtual disk to allow the apportioning.

16. The method of claim 11 further comprising:
    determining a first characteristic of the first data storage device and a second characteristic of the second data storage device, wherein
    the first and the second characteristics are a characteristic that is one of a seek time, a latency, a data transfer rate, a data storage device cache size, and a head position.

17. A method comprising:
    receiving a read request for data;
    apportioning the read request to a first and a second data storage device, wherein
       the data is stored on the first data storage device,
       a substantially identical copy of the data is stored on the second data storage device, the apportioning comprises
  generating a first read operation for a first portion of the data, and
  generating a second read operation for a second portion of the data, and
the first portion of the data and second portion of the data partially overlap one another by at least one block; and
determining a first characteristic of the first data storage device and a second characteristic of the second data storage device.

18. The method of claim 17 wherein the first and the second characteristics are a characteristic that is one of a seek time, a latency, a data transfer rate, a data storage device cache size, and a head position.

19. The method of claim 17 further comprising:
generating a first read operation for a first portion of the data;
generating a second read operation for a second portion of the data;
comparing the first characteristic with the second characteristic; and
transmitting the first read operation to the first data storage device based upon a result of the comparing.

20. The method of claim 17 further comprising:
generating a first read operation for a first portion of the data;
generating a second read operation for a second portion of the data;
comparing the first characteristic with the second characteristic; and
determining the first and the second portions of the data based upon a result of the comparing.

21. The method of claim 17 further comprising:
determining a first characteristic of the first data storage device and a second characteristic of the second data storage device, wherein
  the first and the second characteristics are a characteristic that is one of a seek time, a latency, a data transfer rate, a data storage device cache size, and a head position.

22. A computer program product comprising:
a first set of instructions, executable on a computer system, configured to apportion a read request for data to a first and a second data storage device, wherein each of the first and second data storage devices include substantially identical copies of the data, and
  the first set of instructions comprises a first subset of instructions, executable on the computer system, configured to generate a first and a second read operation for a first portion of the data and a second portion of the data, respectively, wherein the first portion of the data and second portion of the data partially overlap one another by at least one block, and
  a second subset of instructions, executable on the computer system, configured to transmit the first and second read operations to the first and second data storage devices, respectively; and
computer readable media, wherein the computer program product is encoded in the computer readable media.

23. The computer program product of claim 22 further comprising:
a second set of instructions, executable on the computer system, configured to maintain identical copies of the data on the first and second storage devices.

24. The computer program product of claim 22 further comprising:
a second set of instructions, executable on the computer system, configured to transmit the first and second read operations to the first and second data storage devices, respectively, based upon a characteristic of the first and the second data storage devices, respectively.

25. The computer program product of claim 22 further comprising:
a second set of instructions, executable on the computer system, configured to create a virtual disk comprising the first and second storage devices; and
a second set of instructions, executable on the computer system, configured to assign a read policy to the virtual disk to allow the first set of instructions to perform the apportioning.

26. The computer readable medium of claim 22 further comprising instructions, when executed, cause the computer to perform the method further comprising:
determining a first characteristic of the first data storage device and a second characteristic of the second data storage device, wherein
  the first and the second characteristics are a characteristic that is one of a seek time, a latency, a data transfer rate, a data storage device cache size, and a head position.

* * * * *